United States Patent
Hwang et al.

(10) Patent No.: US 8,588,832 B2
(45) Date of Patent: Nov. 19, 2013

(54) PRECODING METHOD FOR FEMTOCELL OR PICOCELL AND COMMUNICATION SYSTEM OF USING THE METHOD

(75) Inventors: Chan Soo Hwang, Yongin-si (KR); Hyo Sun Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 503 days.

(21) Appl. No.: 12/755,250

(22) Filed: Apr. 6, 2010

(65) Prior Publication Data

US 2011/0009140 A1 Jan. 13, 2011

(30) Foreign Application Priority Data

Jul. 13, 2009 (KR) .................. 10-2009-0063426

(51) Int. Cl.
*H04B 7/00* (2006.01)

(52) U.S. Cl.
USPC .................. 455/509; 455/63.1; 455/522.1

(58) Field of Classification Search
USPC ............ 455/63.1, 509, 522; 370/331
See application file for complete search history.

(56) References Cited

U.S. PATENT DOCUMENTS

| | | | |
|---|---|---|---|
| 6,882,851 B2* | 4/2005 | Sugar et al. | 455/454 |
| 8,228,955 B2* | 7/2012 | Tamaki | 370/508 |
| 2008/0146154 A1 | 6/2008 | Claussen et al. | |
| 2008/0261602 A1 | 10/2008 | Livneh | |
| 2009/0042595 A1 | 2/2009 | Yavuz et al. | |
| 2009/0052395 A1 | 2/2009 | Bao et al. | |
| 2009/0197629 A1* | 8/2009 | Borran et al. | 455/522 |
| 2009/0221231 A1* | 9/2009 | Weng et al. | 455/15 |
| 2010/0329113 A1* | 12/2010 | Madan et al. | 370/230 |
| 2011/0021153 A1* | 1/2011 | Safavi | 455/63.1 |

FOREIGN PATENT DOCUMENTS

| | | |
|---|---|---|
| KR | 10-2006-0126497 | 12/2006 |
| KR | 10-2008-0002877 | 1/2008 |
| KR | 10-2009-0004164 | 1/2009 |

* cited by examiner

*Primary Examiner* — Ping Hsieh
*Assistant Examiner* — Chung-Tien Yang
(74) *Attorney, Agent, or Firm* — NSIP Law

(57) ABSTRACT

A precoding method for a femtocell or a picocell and a communication system using the same is provided. The communication system may include a small base station that is able to implement a protection mode to protect a neighbor terminal from an interference regardless of whether a neighbor base station is performing a process to protect the neighbor terminal from the interference. Also, the small base station may use at least one process scheme appropriate for a current environment among various process schemes, thereby effectively protecting the neighbor terminal from the interference.

12 Claims, 5 Drawing Sheets

PRECODING METHOD FOR FEMTOCELL OR PICOCELL AND COMMUNICATION SYSTEM OF USING THE METHOD

CROSS-REFERENCE TO RELATED APPLICATION(S)

This application claims the benefit under 35 U.S.C. §119(a) of Korean Patent Application No. 10-2009-0063426, filed on Jul. 13, 2009, in the Korean Intellectual Property Office, the entire disclosure of which is incorporated herein by reference for all purposes.

BACKGROUND

1. Field

The following description relates to a communication system and method, and additionally, to a small base station, such as a femto base station or a pico base station, that may protects a neighbor terminal corresponding to a neighbor base station, such as a macro base station, from interference.

2. Description of Related Art

Attention to a small base station, such as a femto base station, a pico base station, and the like, has increased. Particularly, there is a macrocell having a broad coverage in a cellular system, and small cells are located within the coverage of the macrocell. Here, a macro base station may be included in various cellular systems, such as Interim Standard 95 (IS-95), code division multiple access (CDMA 2000), wideband CDMA (WCDMA), Worldwide Interoperability for Microwave Access (WiMAX), and the like, and the CDMA 2000, the WCDMA, and the WiMAX support a femtocell.

An interference caused by a small cell may occur in a macrocell which is a neighbor cell of the small cell. Particularly, a signal transmitted from a small base station may be an interference to a macro terminal (a neighbor terminal) corresponding to a macro base station (a neighbor base station). The interference may disturb a communication between the macro base station and the macro terminal.

In general, the macro base station may be installed before femto base stations are installed, and the femto base stations are installed after the macro base station is installed. The femto base stations may frequently repeat turning on/off, and as new femto base stations are added, some femto base stations existing in the communication system may be eliminated.

Accordingly, it may be difficult for the macro base station to overcome a problem caused by the interference from the femto base stations, and changing of a hardware configuration, a software configuration, an operation sequence, and the like of the macro base station to solve the interference caused by the femto base stations may be inefficient. That is, the femto base stations need to solve the problem caused by the interference while minimizing effects on an operation of the macro base station.

SUMMARY

In one general aspect, there is provided a method of operating a small base station corresponding to a target terminal, the method including implementing a protection mode to protect a neighbor terminal from an interference regardless of whether a neighbor base station corresponding to the neighbor terminal is performing a process to protect the neighbor terminal from the interference and performing a process to protect the neighbor terminal from the interference in response to the implementing of the protection mode.

A type of the protection mode may be determined based on information that the small base station is able to acquire among information required for the performing of the process to protect the neighbor terminal from the interference.

A type of the protection mode may be determined based on information that the small base station is able to acquire among channel information of the neighbor terminal, resource allocation information of the neighbor terminal, and transmission traffic information of the neighbor base station.

The method may further include selecting at least one of a plurality of process schemes to protect the neighbor terminal from the interference based on a type of the protection mode, wherein the performing of the process may include performing the process to protect the neighbor terminal from the interference based on the selected at least one process scheme.

The selecting may include selecting at least one of a transmission power control, a null steering beamforming, an interference alignment, a rate splitting precoding, and a dirty paper coding-based precoding.

The method may further include receiving at least one of channel information of the neighbor terminal and resource allocation information of the neighbor terminal, to perform at least one of the transmission power control, the null steering beamforming, and the interference alignment.

The method may further include at least one of receiving a part of transmission traffic information of the neighbor terminal, to perform the rate splitting precoding, and receiving all of the transmission traffic information of the neighbor terminal, to perform the dirty paper coding-based precoding.

The neighbor base station may be a macro base station, and the small base station may be at least one of a femto base station and a pico base station.

The method may further include receiving a request for the protection mode from the neighbor base station based on at least one of an amount of an interference from the small base station to the target terminal or an amount of an interference from the target terminal to the small base station.

In another aspect, there is provided a method of operating a neighbor base station, the method including recognizing an interference between a small base station and a neighbor terminal corresponding to a neighbor base station, determining a type of a protection mode to enable the small base station to perform a process to protect the neighbor terminal from an interference regardless of whether the neighbor base station is performing a process to protect the neighbor terminal from the interference, when an amount of the interference is greater than a predetermined level, and transmitting a request for the determined type of protection mode to the small base station.

The determining of the type of the protection mode may include determining the type of the protection mode based on information that the small base station is able to acquire among information required for performing the process to protect the neighbor terminal from the interference.

The determining of the type of the protection mode may include determining the type of the protection mode based on information that the small base is able to acquire among channel information of the neighbor terminal, resource allocation information of the neighbor terminal, and transmission traffic information of the neighbor base station.

The determining of the type of the protection mode may include selecting at least one of a transmission power control, a null steering beamforming, an interference alignment, a rate splitting precoding, and a dirty paper coding-based precoding, to determine the type of the protection mode.

The method may further include performing a process to enable the small base station to receive at least one of a part of the transmission traffic information or all of the transmission traffic information of the neighbor base station, channel information of the neighbor terminal, and resource allocation information of the neighbor terminal.

In still another aspect, there is provided a method of operating a terminal corresponding to a small base station, the method including receiving a signal for a neighbor terminal from a neighbor base station, receiving a signal for the terminal and the neighbor terminal from the small base station in a protection mode where the small base station protects the neighbor terminal from an interference regardless of whether the neighbor base station is performing a process to protect the neighbor terminal from the interference, and processing an interference caused by the neighbor base station from the received signals.

A computer readable recording media storing a program may implement the method of operating a small base station corresponding to a target terminal.

In yet another aspect, there is provided a small base station configured to communicate with a corresponding target terminal and a neighbor base station, the small base station including a resource allocating/protection mode management unit configured to allocate resources for the target terminal and implement a protection mode to protect a neighbor terminal from an interference regardless of whether a neighbor base station corresponding to the neighbor terminal is performing a process to protect the neighbor terminal from the interference.

The small base station may further include an interference reporting unit configured to report, to the neighbor base station, an interference to the small base station from a neighbor terminal.

The small base station may further include a transmitting unit configured to process transmission traffic information of the small base station and transmission traffic information of the neighbor base station according to a corresponding process scheme, and transmit the processed signal.

In another aspect, there is provided a terminal corresponding to a small base station, the terminal including a receiving unit configured to receive a signal for a neighbor terminal transmitted from a neighbor base station, and to receive a signal for the terminal transmitted from the small base station in a protection mode where the small base station protects the neighbor terminal from an interference regardless of whether the neighbor base station is performing a process to protect the neighbor terminal from the interference and an interference processing unit configured to process an interference caused by the neighbor base station from the received signals.

The terminal may further include a transmitting unit configured to transmit channel information to the small base station.

Also, the signal transmitted from the small base station may include a component for the neighbor terminal and a component for the terminal.

Other features and aspects will be apparent from the following detailed description, the drawings, and the claims.

Figure 1:
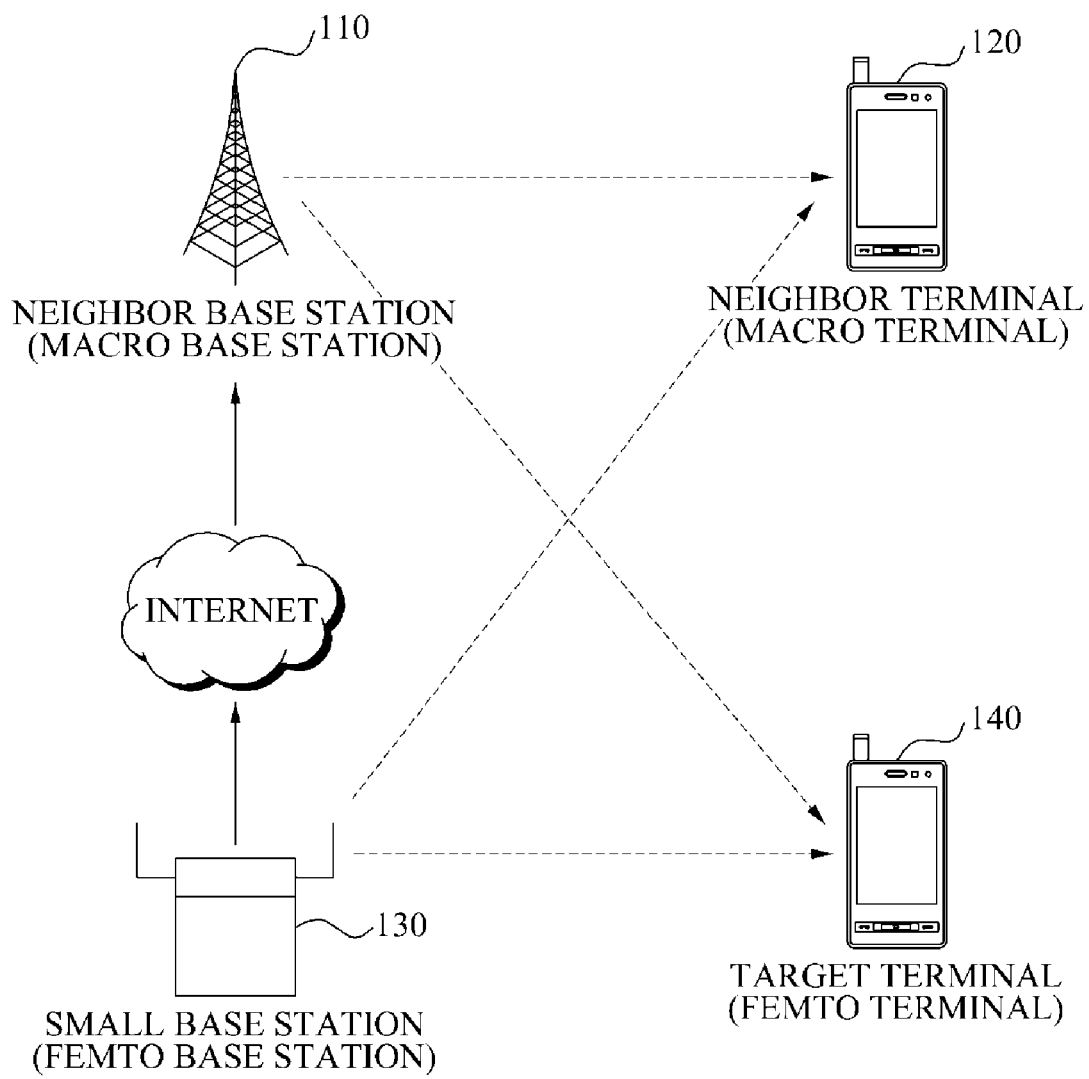
FIG. 1 is a diagram illustrating a communication system including a macro base station, a macro terminal, a femto base station, and a femto terminal, according to a related art.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 1 illustrates a communication system including a macro base station, a macro terminal, a femto base station, and a femto terminal, according to related art.

A neighbor base station 110 (macro base station) may construct a transmission/reception pair with a neighbor terminal 120 (macro terminal), and a small base station 130 (femto base station) may construct a transmission/reception pair with a target terminal 140. Here, the macro base station 110 and the femto base station 130 are connected via the Internet.

When the macro base station 110, the macro terminal 120, the femto base station 130, and the femto terminal 140 perform communication by using an identical radio resource, for example, a time resource and a frequency resource, interference may occur in the two transmission/reception pairs. In particular, a signal transmitted from the femto base station 130 may be an interference to the macro terminal 120 and thus, protection of the macro terminal 120 from the interference should be considered.

To address the problem caused by the interference occurring in the macro terminal 120, the macro base station 110 and the femto base station 130 respectively use different frequency bands. In particular, the macro base station 110 and the femto base station 130 may use a Frequency Division Multiplexing (FDM) in an Orthogonal Frequency Division Multiple Access (OFDMA). However, the FDM may cause a decrease in a cell capacity of a macro cell and may require change of a configuration of the macro base station 110, and thus, installation of a plurality of femto base stations may be difficult. Also, the macro base station 110 and the femto base station 130 may use a Dynamic Spectrum Management (DSM). However, for the DSM, the macro base station 110 and the femto base station 130 may have difficulty exchanging channel information and the like with each other.

Also, the macro base station 110 and the femto base station 130 may use Distributed multiple input multiple output (MIMO) to solve the problem caused by the interference occurring in the macro terminal 120. That is, each of the macro base station 110 and the femto base station 130 may perform precoding in cooperation with each other, and generate a transmission signal. In this instance, when each of the macro base station 110 and the femto base station 130 perform precoding, the interference may be reduced or eliminated in advance. However, the macro base station 110 and the femto base station 130 may need to know transmission traffic information, channel information, and resource allocation information of each other to support the precoding, and thus, a large amount of overhead may occur. In addition, when a plurality of femto base stations exist, performing of the precoding by the macro base station may become complex, and thus, there may be difficulty in installing the plurality of femto base stations.

Accordingly, there is need to address the problem caused by the interference occurring in the macro terminal 120, while minimizing a change, an overhead, and the like, given to the macro base station 110. Although it is described below, according to examples of embodiments, the femto base station 130 may perform precoding independent from the macro base station 110, and thereby may address the problem caused by the interference occurring in the macro terminal 120.

Figure 2:
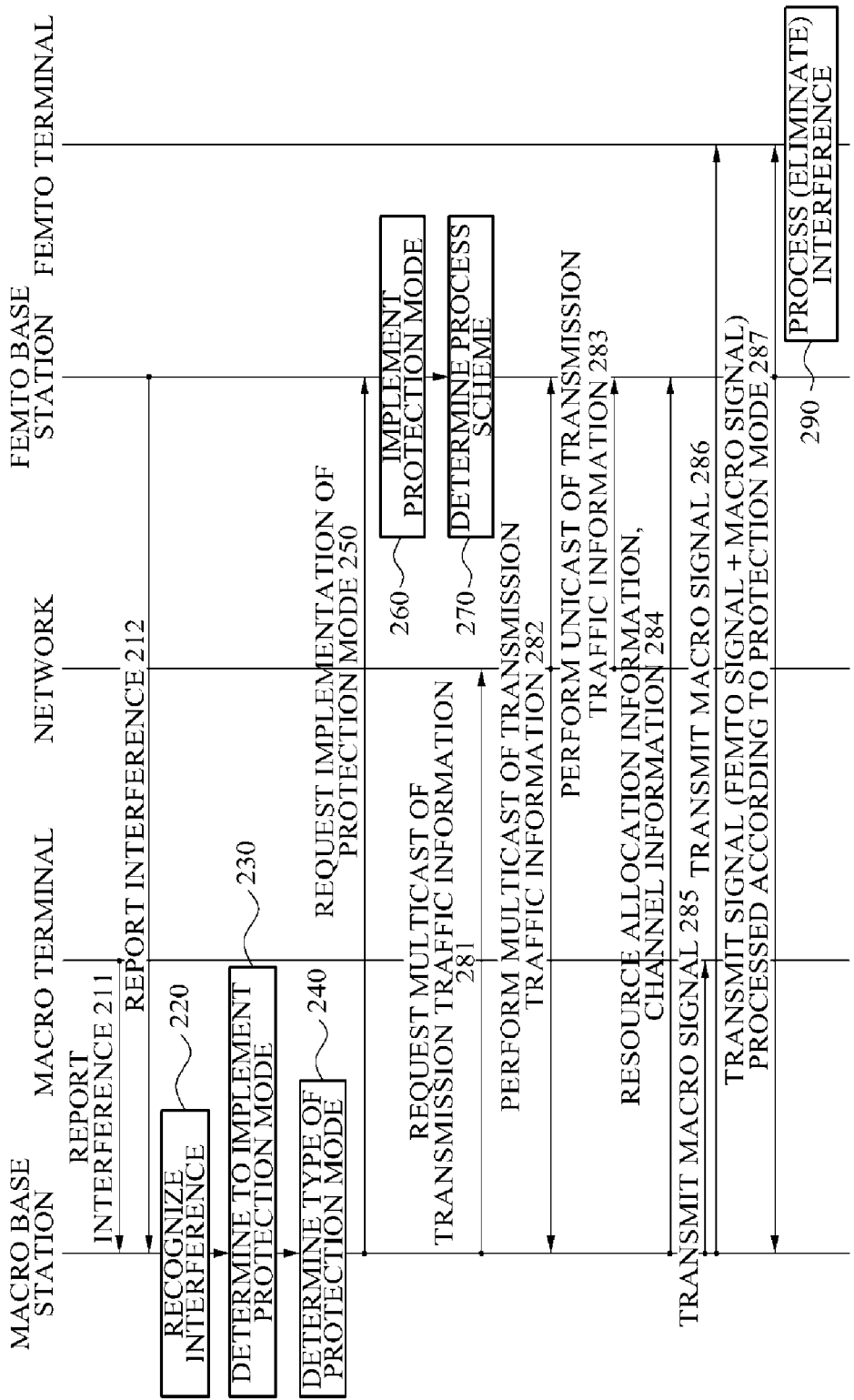
FIG. 2 is a flowchart illustrating an example of operations of a macro base station, a macro terminal, a femto base station, and a femto terminal.

FIG. 2 illustrates an example of operations of a macro base station, a macro terminal, a femto base station, and a femto terminal.

The macro terminal may report, to the macro base station, an interference caused by the femto base station in operation 211. In this instance, the interference may be channel information to the macro terminal from the femto base station. As an example, the macro terminal receives broadcasting information of the femto base station, estimates a quality of a signal received from the femto base station, and reports the quality of the signal to the macro base station 211.

The femto base station optionally reports, to the macro base station, an interference to the femto base station from the macro terminal in operation 212. In this instance, the macro base station may recognize an interference to the macro terminal from the femto base station based on the interference to the femto base station from the macro terminal.

Also, the macro base station recognizes the interference between the femto base station and the macro terminal based on the report from the macro terminal or the femto base station in operation 220. Further, the macro base station determines whether to implement a protection mode to protect the macro terminal from the interference caused by the femto base station in operation 230. As an example, whether to implement the protection mode is determined based on a ratio of a power of a signal from the macro base station to the macro terminal and a power of a signal from the femto base station to the macro terminal.

In this instance, when the protection mode is implemented with respect to a plurality of macro terminals, the macro base station determines to implement the protection mode only for a predetermined number of macro terminals. Here, the macro base station may consider a priority of each of the macro terminals, and the priority may be determined based on a quality of service requirement of each terminal, a delay constraint, a queue length, and the like.

Also, when the protection mode is determined to be implemented, the macro base station determines a type of the protection mode in operation 240.

A type of protection mode is classified based on a process scheme that used by the femto base station to protect the macro terminal. Process schemes according to examples of embodiments may include, but are not limited to, a transmission power control, a null steering beamforming, an interference alignment, a rate splitting precoding, a dirty paper coding-based precoding, and the like. The classification of the protection mode is described with reference to FIG. 3.

Figure 3:
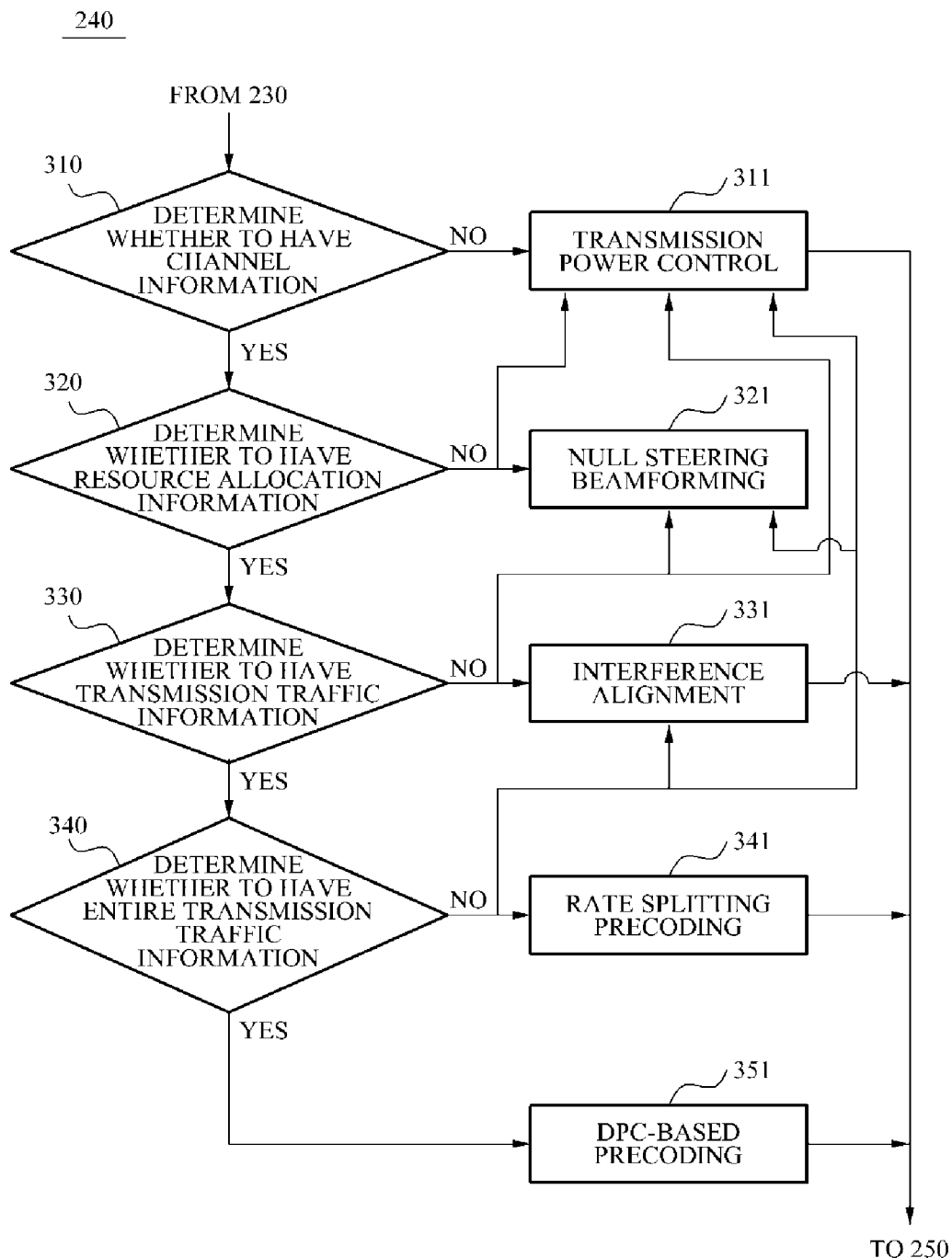
FIG. 3 is a flowchart illustrating an example of a method of determining a type of protection mode.

FIG. 3 is a flowchart illustrating an example of method of determining a type of protection mode.

A macro base station determines the type of the protection mode based on information that a femto base station is able to acquire among channel information of a macro terminal (in particular, interference channel information), resource allocation information of the macro terminal, and transmission traffic information of the macro base station.

The macro base station may determine whether the femto base station has or is able to acquire channel information between the macro terminal and the femto base station in operation 310.

When the femto base station does not have channel information and is not able to acquire the channel information, the macro base station determines a type having a process scheme of transmission power control. In the protection mode where the process scheme is the transmission power control, the femto base station may independently control transmission power, and may protect the macro terminal from the interference caused by the femto base station.

Conversely, when the femto base station has the channel information or is able to acquire the channel information, the macro base station may determine whether the femto base station has or is able to acquire the resource allocation information of the macro terminal in operation 320.

In this instance, when the femto base station does not have the resource allocation information and is not able to acquire the resource allocation information, the macro base station may determine a type having at least one process scheme of the transmission power control and null steering beamforming. Here, the femto base station may use the null steering beamforming based on the channel information of the macro terminal, and minimize a beam energy heading toward a location of the macro terminal. In this instance, when the femto base station does not have the resource allocation information and is not able to acquire the resource allocation information, the femto base station may use the transmission power control together with the null steering beamforming.

Also, the macro base station may determine whether the femto base station has the transmission traffic information of the macro base station or is able to acquire the transmission traffic information of the macro base station in operation 330. When the femto base station does not have the transmission traffic information and is not able to acquire the transmission traffic information, the macro base station may determine a type having at least one process scheme of the transmission power control, the null steering beamforming, and the interference alignment. Here, the femto base station may perform interference alignment based on the channel information of the macro terminal and the resource allocation information of the macro terminal, to enable interferences to be aligned in the macro terminal. In this instance, when the femto base station does not have the transmission traffic information and is not able to acquire the transmission traffic information, at least two of the transmission power control, the null steering beamforming, and interference alignment may be used.

Also, the macro base station may determine whether the femto base station has all of the transmission traffic information or is able to acquire all of the transmission traffic information in operation 340. When the macro base station is able to report only a part of its transmission traffic information to the femto base station, the macro base station may determine a type having at least one process scheme of the transmission power control, the null steering beamforming, the interference alignment, the rate splitting precoding. Conversely, when the macro base station is able to report all of its own transmission traffic information to the femto base station, the macro base station may determine a type having a process scheme of a dirty paper coding (DPC)-based precoding. In this instance, although not illustrated in FIG. 3, the macro base station optionally use at least one of the transmission power control, the null steering beamforming, and the interference alignment.

The rate splitting precoding and the DPC-based precoding is described below.

When the type of protection mode is determined through the process described in FIG. 3, the macro base station may request the femto base station to implement the determined type of protection mode in operation 250.

Also, the femto base station implements the protection mode in response to the request of the macro base station in operation 260. As described above, in the protection mode, the femto base station may independently perform a process to protect the macro terminal regardless of whether the macro base station is performing a process to protect the macro terminal.

Also, the femto base station may determine a process scheme corresponding to the determined type of protection mode in operation 270. That is, at least one process scheme of the transmission power control, the null steering beamforming, the interference alignment, the rate splitting precoding, and the DPC-based precoding may be determined as the process scheme.

Here, it may be assumed that the rate splitting precoding is determined as the process scheme.

In this instance, the macro base station may request multicast of a part of the transmission traffic information of the macro base station via a network in operation 281. The source may then multicast the transmission traffic information of the macro base station to the macro base station and the femto base station via the network in operation 282.

Also, the source of the network may unicast the transmission traffic information of the femto base station to the femto base station in operation 283.

In addition, the macro base station may provide the resource allocation information and the channel information to the femto base station in operation 284.

Further, the macro base station may transmit a macro signal corresponding to the transmission traffic information of the macro base station in operations 285 and 286. Here, the macro signal is received by the femto terminal, as well as by the macro terminal.

Also, the femto base station may process (perform precoding) the transmission traffic information of the macro base station and the transmission traffic information of the femto base station based on the protection mode, and transmit the processed signal in operation 287. In this instance, the transmitted signal from the femto base station is received by the macro base station or the femto terminal.

Here, although not illustrated in FIG. 2, an interference caused by the femto base station does not occur in the macro terminal since the protection mode is implemented, and the femto terminal appropriately processes the received signal, thereby eliminating or controlling an interference caused by the macro base station.

An example of the rate splitting precoding is described below. For reference, the DPC-based precoding provides that the transmission traffic information of the macro base station and the transmission traffic information of the femto base station are processed according to a DPC scheme when the femto base station knows all of the transmission traffic information of the macro base station to protect the macro terminal from the interference.

It may be assumed that the macro base station includes $t_1$ transmission antennas, the femto base station includes $t_2$ transmission antennas, the macro terminal includes $r_1$ reception antennas, and the femto terminal includes $r_2$ reception antennas. Also, it may be assumed that a channel to the macro terminal from the macro base station is $H_{11}$, a channel to the femto terminal from the macro base station is $H_{12}$, a channel to the macro terminal from the femto base station is $H_{21}$, and a channel to the femto terminal from the femto base station is $H_{22}$.

When the macro base station transmits a vector u including u complex numbers, the vector u may be rate-split into $u_1$ and $u_2$ as given in Equation 1 below.

$$u = [u_1 u_2] \in R^{u_1 + u_2}$$

$$u_1 + u_2 = u \quad \text{[Equation 1]}$$

The femto base station transmits a vector v including v complex numbers. In this instance, when a precoding matrix of the macro base station is A and a precoding matrix of the femto base station is B, a signal transmitted from the macro base station may be expressed as given in Equation 2 below.

$$x_1 = A u^T \quad \text{[Equation 2]}$$

$$= (A_1 A_2)(u_1 u_2)^T$$

Also, a signal transmitted from the femto base station may be expressed as given in Equation 3 below.

$$x_2 = B \begin{pmatrix} u_1^T \\ v^T \end{pmatrix} \quad \text{[Equation 3]}$$

$$= (B_1 B_2) \begin{pmatrix} u_1^T \\ v^T \end{pmatrix}$$

In this instance, a received signal of the macro terminal may be expressed as given in Equation 4 below.

$$y_1 = H_{11} A u^T + H_{21} B \begin{pmatrix} u_1^T \\ v^T \end{pmatrix} + n_1 \quad \text{[Equation 4]}$$

$$= H_{11} A u^T + H_{21} B_1 u_1^T + H_{21} B_2 v^T + n_1,$$

$$= (H_{11} A_1 + H_{21} B_1) u_1^T + H_{11} A_2 u_2^T +$$

$$H_{21} B_2 v^T + n_1,$$

where $H_{11} \in \mathcal{R}^{r_1 \times t_1}$, $H_{21} \in \mathcal{R}^{r_1 \times t_2}$, $n_1 \in \mathcal{R}^{r_1}$.

Also, a received signal of the femto terminal may be expressed as given in Equation 5 below.

$$y_2 = H_{12}Au^T + H_{22}B\begin{pmatrix} u_1^T \\ v^T \end{pmatrix} + n_2 \quad \text{[Equation 5]}$$
$$= H_{12}Au^T + H_{22}B_1u_1^T + H_{22}B_2v^T + n_2$$
$$= (H_{12}A_1 + H_{22}B_1)u_1^T + H_{12}A_2u_2^T +$$
$$H_{22}B_2v^T + n_2,$$

where $H_{12} \in \mathcal{R}^{r_2 \times t_1}$, $H_{22} \in \mathcal{R}^{r_2 \times t_2}$, $n_2 \in \mathcal{R}^{r_2}$.

In this instance, when each of the macro terminal and the femto terminal is a zero forcing receiver, the macro terminal may eliminate a term related to v from $y_1$, and the femto terminal may eliminate a term related to $u_i$ from $y_2$. An SINR may be improved by eliminating the term related to the v from $y_1$, and eliminating the term related to the $u_1$ from $y_2$. A zero forcing solution to eliminate the term related to the v from $y_1$, and to eliminate the term related to the $u_1$ from $y_2$ may be expressed as given in Equation 6 below.

$$B_2 = (H_{21}{}^*H_{21})^{-1}H_{21}{}^*$$

$$B_1 = -(H_{22}{}^*H_{22})^{-1}H_{22}{}^*H_{12}A_1 \quad \text{[Equation 6]}$$

Also, the macro base station uses the precoding matrix A, and the macro base station is not able to know channel information with the femto base station and channel information with the femto terminal, and thus, the precoding matrix A is made to be dependent upon $H_{11}$. When the femto base station performs the zero forcing precoding, a component related to the v may be completely eliminated from $y_1$. Also, when a channel related to $u_1$ is estimated, the macro terminal may automatically estimate ($H_{11}A_1+H_{21}B_1$), and thus, the macro base station may apply various precoding schemes applicable to a single user MIMO channel.

Figure 4:
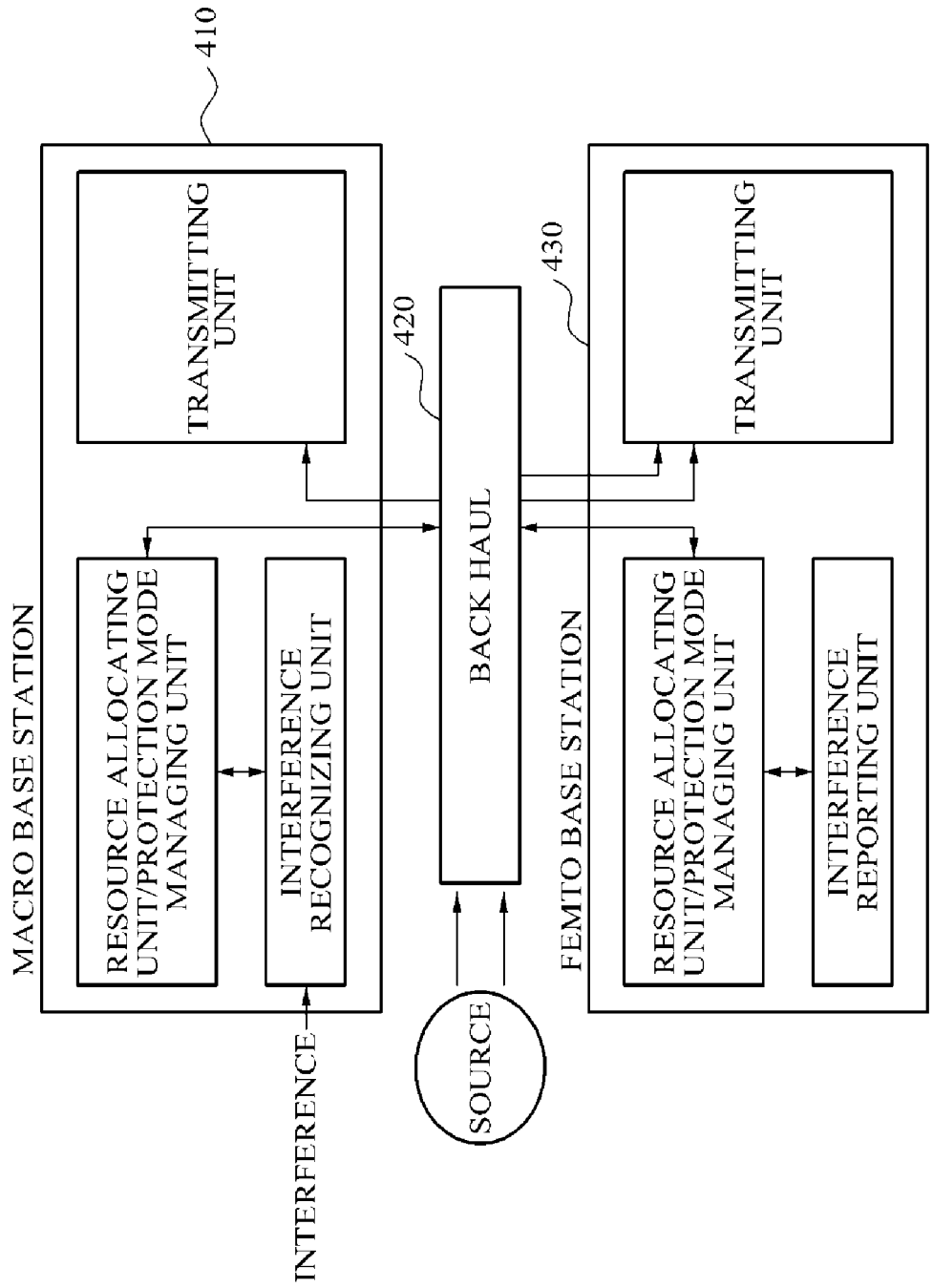
FIG. 4 is a block diagram illustrating an example of a macro base station and an example femto base station.

The processes, functions, methods and/or software described above/herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner FIG. 4 illustrates an example of a macro base station and an example femto base station.

The macro base station 410 according to examples of embodiments includes a resource allocating unit/protection mode managing unit, an interference recognizing unit, and a transmitting unit. A femto base station 430 includes a resource allocating unit/protection mode implementing unit, an interference reporting unit, and a transmitting unit. The macro base station 410 and the femto base station 430 are connected through a backhaul 420.

The interference recognizing unit of the macro base station 410 may recognize an interference between the femto base station 430 and a macro terminal corresponding to the macro base station 410. In this instance, the interference recognizing unit of the macro base station 410 may recognize the interference based on a report of the femto base station 430 or a report of the macro terminal.

Also, the resource allocating unit/protection mode managing unit of the macro base station 410 may compare an amount the of interference with a predetermined level, may determine the femto base station 430 to implement a protection mode, and may determine a type of protection mode. Also, the resource allocating unit/protection mode managing unit of the macro base station 410 may request the femto base station 430 to implement the determined type of protection mode Additionally, the interference recognizing unit of the macro base station 410 may request a source to multicast transmission traffic information of the macro base station 410.

In this instance, the source may multicast the transmission traffic information of the macro base station 410 to the macro base station 410 and the femto base station 430. Also, the source may unicast the transmission traffic information of the femto base station to the femto base station 430 via the backhaul 420.

Also, the resource allocating unit/protection mode managing unit of the macro base station 410 may transmit resource allocation information of the macro terminal and channel information to the femto base station 430.

In addition, the transmitting unit of the macro base station 410 may transmit a macro signal generated by processing the transmission traffic information of the macro base station 410 according to a precoding scheme applicable to a single user MIMO channel.

Furthermore, the resource allocating unit/protection mode implementing unit of the femto base station 430 allocates resources for the femto terminal and implements the protection mode. Also, an interference reporting unit of the femto base station 430 optionally reports, to the macro base station 410, an interference to the femto base station 430 from the macro terminal.

Further still, the femto base station 430 may receive the transmission traffic information of the macro base station 410, in addition to the transmission traffic information of the femto base station 430. In this instance, the transmitting unit of the femto base station 430 processes the transmission traffic information of the femto base station 430 and the transmission traffic information of the macro base station 410 according to a corresponding process scheme, and may transmit the processed signal.

Figure 5:
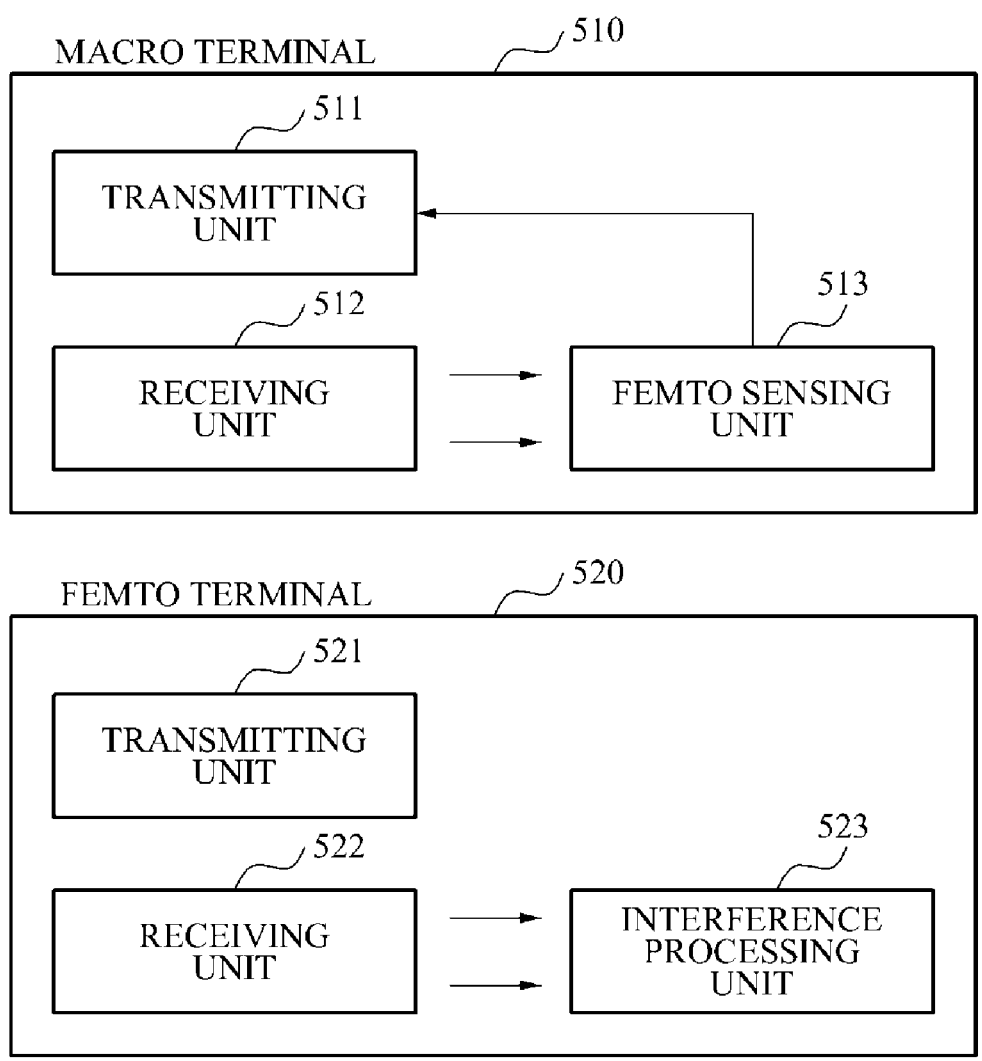
FIG. 5 is a block diagram illustrating an example of a macro terminal and an example femto terminal.

FIG. 5 illustrates an example of a macro terminal and an example femto terminal.

Here the macro terminal 510 includes a transmitting unit 511, a receiving unit 512, and a femto sensing unit 513. The femto terminal 420 includes a transmitting unit 521, a receiving unit 522, and an interference processing unit 523.

The receiving unit 512 of the macro terminal 510 may receive broadcasting information from a femto base station, the femto sensing unit 513 may recognize an interference caused by the femto base station. Also, the transmitting unit 511 may transmit, to a macro base station, channel information between the femto base station and the macro terminal 511.

Also, the receiving unit 512 of the macro terminal 510 may receive a macro signal transmitted form the macro base station and a signal transmitted from the femto base station. Here, although the signal transmitted from the femto base station may include a component for the macro terminal 510 and a component for the femto terminal 520, the component for the femto terminal 520 may become null in the macro terminal 510 or may be appropriately eliminated.

Also, the transmitting unit 521 of the femto terminal 520 may transmit various information, for example, channel information and the like, to the femto base station and the like. In addition, the receiving unit 522 receives the macro signal transmitted from the macro base station, and also receives the signal transmitted from the femto base station. Here, as described above, the signal transmitted from the femto base station may include the component for the macro terminal 510 and the component for the femto terminal 520.

In this instance, the interference processing unit 523 may appropriately eliminate or process the component for the macro terminal 510 among the macro signal transmitted from the macro base station and the signal transmitted from the femto base station, thereby extracting the component for the femto terminal 520.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of operating a small base station corresponding to a target terminal, the method comprising:
    receiving a request for a protection mode from a neighbor base station based on at least one of an amount of interference resulting from communication from the small base station to the target terminal or an amount of interference resulting from communication from the target terminal to the small base station;
    implementing the protection mode to protect a neighbor terminal from interference regardless of whether the neighbor base station corresponding to the neighbor terminal is performing a process to protect the neighbor terminal from the interference; and
    performing a rate-splitting-precoding process or a dirty-paper-coding based precoding process to protect the neighbor terminal from the interference upon implementing the protection mode, wherein:
    a part of the neighbor terminal's transmission traffic information is received to perform the rate-splitting-precoding process; and
    all of the neighbor terminal's transmission traffic information is received to perform the dirty-paper-coding based precoding process.

2. The method of claim 1, wherein a type of the protection mode is determined based on information that the small base station is able to acquire among information required for performing the rate-splitting-precoding process or the dirty-paper-coding based precoding process to protect the neighbor terminal from the interference.

3. The method of claim 1, wherein a type of the protection mode is determined based on information that the small base station is able to acquire among channel information of the neighbor terminal, resource allocation information of the neighbor terminal, and transmission traffic information of the neighbor base station.

4. The method of claim 1, wherein:
    the neighbor base station comprises a macro base station; and
    the small base station comprises at least one of a femto base station and a pico base station.

5. A method of operating a neighbor base station, the method comprising:
    recognizing interference between a small base station and a neighbor terminal corresponding to the neighbor base station;
    determining a type of a protection mode to enable the small base station to perform a process to protect the neighbor terminal from interference regardless of whether the neighbor base station is performing a process to protect the neighbor terminal from the interference, when an amount of the interference is greater than a predetermined level; and
    transmitting a request for the determined type of protection mode to the small base station, wherein:
    the determined type of protection mode corresponds to performing a rate-splitting-precoding process or a dirty-paper-coding based precoding process,
    a part of the neighbor terminal's transmission traffic information is transmitted to the small base station when the determined type of protection mode corresponds to performing the rate-splitting-precoding process, and
    all of the neighbor terminal's transmission traffic information is transmitted to the small base station when the determined type of protection mode corresponds to performing the dirty-paper-coding based precoding process.

6. The method of claim 5, wherein the determining the type of the protection mode comprises determining the type of the protection mode based on information that the small base station is able to acquire among information required for performing the rate-splitting-precoding process or the dirty-paper-coding based process to protect the neighbor terminal from the interference.

7. The method of claim 5, wherein the determining the type of the protection mode comprises determining the type of the protection mode based on information that the small base is able to acquire among channel information of the neighbor terminal, resource allocation information of the neighbor terminal, and transmission traffic information of the neighbor base station.

8. The method of claim 5, further comprising performing a process to enable the small base station to receive part or all of transmission traffic information of the neighbor base station, channel information of the neighbor terminal, and resource allocation information of the neighbor terminal.

9. A method of operating a terminal corresponding to a small base station, the method comprising:
    receiving a signal for a neighbor terminal from a neighbor base station;
    receiving a signal for the terminal and the neighbor terminal from the small base station in a protection mode where the small base station performs a rate-splitting-precoding process or a dirty-paper-coding based precoding process to protect the neighbor terminal from interference regardless of whether the neighbor base station is performing a process to protect the neighbor terminal from the interference; and processing interference caused by the neighbor base station from the received signals, wherein
the signal transmitted from the small base station comprises a component for the neighbor terminal and a component for the terminal.

10. A non-transitory computer readable recording media storing a program implementing the method of claim 1.

11. A small base station configured to communicate with a corresponding target terminal and a neighbor base station, the small base station comprising:
   a resource allocating/protection mode management unit configured to:
   allocate resources for the target terminal;
   implement a protection mode to protect a neighbor terminal from interference regardless of whether the neighbor base station corresponding to the neighbor terminal is performing a process to protect the neighbor terminal from the interference;
   perform a rate-splitting-precoding process or a dirty-paper-coding based precoding process to protect the neighbor terminal from the interference upon implementing the protection mode; and
   an interference reporting unit configured to report, to the neighbor base station, interference received by the small base station from the neighbor terminal, wherein:
   a part of the neighbor terminal's transmission traffic information is received to perform the rate-splitting-precoding process; and
   all of the neighbor terminal's transmission traffic information is received to perform the dirty-paper-coding based precoding process.

12. The small base station of claim 11, further comprising a transmitting unit configured to:
   process transmission traffic information of the small base station and transmission traffic information of the neighbor base station according to a corresponding process scheme; and
   transmit the processed signal.

* * * * *